(12) United States Patent
Sauler et al.

(10) Patent No.: US 7,295,916 B2
(45) Date of Patent: Nov. 13, 2007

(54) METHOD AND DEVICE FOR DETECTING KNOCKING

(75) Inventors: Juergen Sauler, Stuttgart (DE); Carsten Kluth, Stuttgart (DE); Heiko Ridderbusch, Stuttgart-Moehringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/541,205

(22) PCT Filed: Oct. 6, 2003

(86) PCT No.: PCT/DE03/03299

§ 371 (c)(1),
(2), (4) Date: Dec. 5, 2005

(87) PCT Pub. No.: WO2004/063694

PCT Pub. Date: Jul. 29, 2004

(65) Prior Publication Data

US 2006/0129303 A1 Jun. 15, 2006

(30) Foreign Application Priority Data

Jan. 8, 2003 (DE) ................................ 103 00 204

(51) Int. Cl.
*G01L 23/22* (2006.01)
*G01M 15/00* (2006.01)
(52) U.S. Cl. ...................... 701/111; 73/117.3; 73/35.01
(58) Field of Classification Search ................ 701/114, 701/111, 102; 73/116, 117.3, 118.1, 35.03–35.08; 123/406.29, 406.34, 406.39
See application file for complete search history.

(56) References Cited

U.S. PATENT DOCUMENTS

| 5,267,164 A | 11/1993 | Miyama ...................... 701/111 |
| 5,535,722 A | 7/1996 | Graessley et al. ..... 123/406.21 |
| 5,537,855 A | 7/1996 | Hunninghaus et al. ..... 73/35.05 |
| 6,012,425 A * | 1/2000 | Unland et al. .......... 123/406.38 |
| 6,145,491 A * | 11/2000 | Wilstermann et al. . 123/406.35 |
| 6,456,927 B1 * | 9/2002 | Frankowski et al. ........ 701/111 |

FOREIGN PATENT DOCUMENTS

| DE | 40 27 354 | 3/1991 |
| EP | 0 454 486 | 10/1991 |
| EP | 0 731 349 | 9/1996 |

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

A method and a device for detecting knocking, in which a measurement signal of a knock sensor is evaluated during combustion in a cylinder of a combustion engine to determine whether the combustion occurred with knocking. The measurement signal is subdivided into a plurality of windows, and in each window an examination is performed to determine whether the combustion occurred with knocking. For a final assessment of whether the combustion occurred with knocking, the events of windows are compared to each other.

18 Claims, 1 Drawing Sheet

METHOD AND DEVICE FOR DETECTING KNOCKING

FIELD OF THE INVENTION

The present invention is directed to a method and a device for detecting knocking.

BACKGROUND INFORMATION

German Patent No. DE 4027354 describes a method and a device for detecting knocking, in which a measuring signal of a knock sensor is examined in a measuring window during a combustion process in a cylinder of an internal combustion engine. The examination determines whether the combustion occurred with knocking. Knocking combustion in the cylinder of an internal combustion engine refers to an uncontrolled combustion process, in particular a combustion process in which controlled ignition of the combustion mixture by an ignition spark does not occur, but rather self-ignition occurs. With such knocking combustion, unacceptably high pressures or temperatures occur in individual parts of the combustion chamber, and there is danger of damage to the internal combustion engine. The sense and purpose of a method or device for detecting knocking is therefore to operate the internal combustion engine in an operating range in which knocking combustion is avoided. On the other hand, operation as close as possible to this zone of knocking combustion is desirable, since the combustion process occurs particularly economically and cleanly there.

SUMMARY

A method and the device according to an example embodiment of the present invention for detecting knocking may have the advantage that the accuracy of the knock detection is improved. In particular, it makes it possible for individual events that occur during the combustion process to not be judged erroneously as knocking signals. This is particularly advantageous in direct-injection gasoline engines, since valves and the like are operated there during the combustion process, and as a result interfering noises are produced that impair knock detection. The method according to the present invention is also particularly advantageous if the cylinder of the combustion engine is operated using a piston that has a high center of gravity (top-heavy piston). In the case of such pistons, a tilting motion occurs in the area of the top dead center point, which also results in interfering noises.

A particularly certain decision regarding the presence of knocking or non-knocking combustion may be made if three windows are examined, the combustion necessarily being detected as knocking in at least two windows. The time width of the windows may be specified in a fixed or a variable manner. In the case of a variable time width, it may be particularly advantageous to provide for speed-dependence, in order to take into account the greater changes in combustion at higher speeds. In addition, gaps may also be provided between the windows, in particular if an interfering signal occurs at a predictable point in time.

BRIEF DESCRIPTION OF THE DRAWINGS

Exemplary embodiments of the present invention are illustrated in the figures and explained in greater detail in the following description.

DETAILED DESCRIPTION OF EXAMPLE EMBODIMENTS

In combustion chambers of combustion engines, abnormal combustion processes may occur which are referred to as knocking. This knocking results from self-ignition of the combustible mixture, which is not yet affected by the flame front that is spreading out from the spark plug. With such knocking, strong pressure or temperature peaks which may damage the cylinder or piston occur at individual locations in the combustion chamber. The frequency of such knocking combustions depends on the operating state of the internal combustion engine. Despite the tendency for knocking combustion, operation in this zone is desirable, since the combustion there is particularly efficient and low in pollutants. The knocking event is manifested as pressure fluctuations in the cylinder, which subside as the combustion process continues. Knocking thus does not occur at an individually defined point in time, but is manifested as a vibration that is observable in a period of time. The observation is made by knock sensors, which detect a signal that derives from the pressure variations in the cylinder. Conventional knock sensors are designed, for example, as structure-borne sound sensors, i.e., as acceleration sensors which are attached to the engine block. The pressure peaks in the combustion chambers produce sound waves in the engine block, which are detected by these acceleration sensors. In addition, some conventional knock sensors deduce a pressure signal from the combustion chamber directly. In the case of structure-borne sound sensors in particular, other events may also result in a signal. Suitable for this are all events that produce a structure-borne sound signal in the engine block, such as operation of valves or the like.

Figure 1:
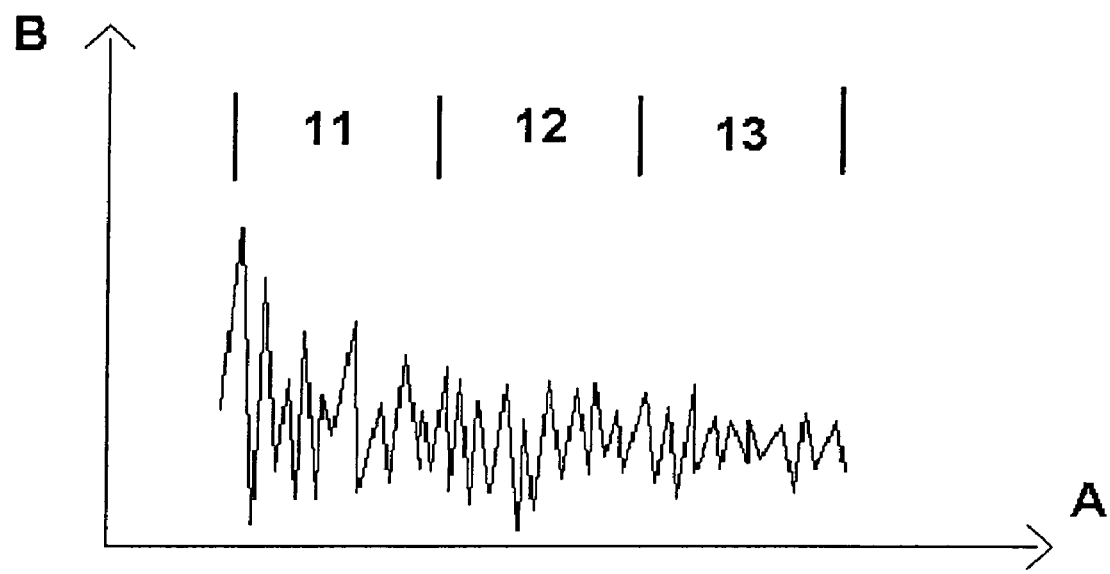
FIG. 1 shows the course of a measuring signal.

FIG. 1 shows an example of a signal of a knock sensor, for example an acceleration sensor or a pressure sensor. The intensity of this signal is plotted on the B axis. The time slope is plotted on the A axis. In FIG. 1, the time is plotted on the A axis. Alternatively, the crankshaft angle could also be plotted here. The diagram in FIG. 1 thus depicts the intensity of the measuring signal over time. As may be seen from FIG. 1, the knock signal is manifested as an irregular vibration, which decreases in intensity over time.

FIG. 1 portrays a knocking signal, i.e., the intensity fluctuations are relatively high. In the case of a non-knocking signal, the intensity fluctuations would be significantly smaller.

Also recorded in FIG. 1 are a plurality of time windows 11, 12, 13, each of which represents a measuring window. The knocking signal is examined in each of these measuring windows to determine whether knocking combustion is involved. The signal course portrayed in FIG. 1 represents the knocking signal of a single combustion process. A predefined time window is usually specified for the examination of whether the combustion occurred with knocking. To let the signal become as strong as possible, the longest possible measuring range is of interest; i.e., normally depicted measuring windows 11, 12, 13 are considered together in order to form an overall signal. The assessment of whether the combustion occurred with knocking is then made on the basis of this overall signal. The length of this overall range is normally designed to be as long as a knocking signal is reasonably detectable. According to the present invention, it is proposed to further subdivide the reasonable measuring range, in particular into a plurality of windows 11, 12, 13. Within each of these individual windows 11, 12, 13, a separate determination is made of whether knocking combustion occurred. By comparing the results thus found, a final result is then formed which contains a statement about whether knocking combustion occurred. If three windows 11, 12, 13 are provided for the measurement, as in FIG. 1, it is advantageous to identify a knocking event only if knocking combustion was detected in at least two of the three windows 11, 12, 13. Knock detection may thus be improved by this procedure. In particular, individual strong signals that occur in only one of windows 11, 12, 13 may be rejected as implausible. As described above, such individual signals may occur as a result of additional events in the combustion engine. Such an event may be, for example, the closing of a fuel injector in a direct-injection combustion engine. Furthermore, in the case of top-heavy pistons, tilting motions may occur in the vicinity of the top dead center point, which also may result in an individual strong pulse in the knocking signal during the combustion signal. However, such an individual event occurs only at a single moment during the course of combustion, i.e., a corresponding signal occurs only in a single window. The intensity of these signals may be very high, however, so that in an overall analysis of all three windows, a knocking signal would erroneously be concluded.

Figure 2:
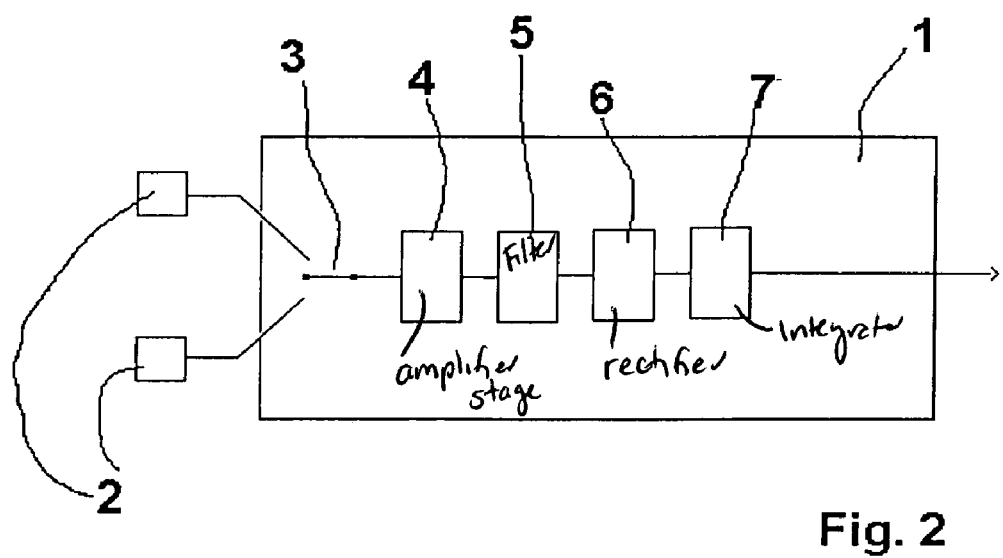
FIG. 2 schematically shows a device for detecting knocking.

FIG. 2 shows an example of a device for processing knocking signals. The device for processing knocking signals 1 has a plurality of inputs, the signals from a plurality of knock sensors 2 being fed to each input. This plurality of knock sensors 2 may be, for example, structure-borne sound sensors, which are implemented, for example, as piezoelectric acceleration sensors. Knock sensors 2 are assigned to different cylinders, and are attached to the engine block at places where they are able to effectively receive the signals for the particular cylinders. A configuration as in FIG. 2, having two knock sensors 2, is good for example for measuring knocking signals in a four cylinder engine. Since the combustions do not occur simultaneously but sequentially, the signals from the individual knock sensors may be processed sequentially by the device for knocking detection 1. To this end, the signals from knock sensors 2 are fed to the device for knocking detection 1. Using a multiplexer 3, these signals which are present at the inputs are read appropriately by the inputs which are assigned to different knock sensors 2. Positioned downstream from multiplexer 3 is an amplifier stage 4, in which an amplification of the knocking signals occurs. Positioned downstream from amplifier stage 4 is a filter 5. Filter 5 is designed as a bandpass filter, since knocking signals occur only in a certain frequency range. The output signal from filter 5 is fed to a rectifier 6, in which the signals are rectified. This rectifier is necessary because the knocking signals may be either positive or negative and only the absolute intensity is of interest. Downstream from rectifier 6 is an integrator 7, in which the rectified signals are integrated over a predefined time period. The signal thus integrated is a measure of the knock intensity, and is emitted by the device for detecting knocking. In another unit, for example in the control device, which is not shown here, this integrated knock intensity value is then compared to a reference value.

The integration in integrator 7 normally occurs over the entire time period, i.e., the entire time period in which knock signals may occur is considered for each combustion process. According to the present invention, integrator 7 is now activated in such a way that instead of one integrated signal over the entire time period, three different signals are emitted sequentially, each signal corresponding to an integration in windows 11, 12, and 13. These are then compared individually to reference values, and the comparison to the reference value is used to determine whether a knocking combustion process is present in particular window 11, 12, 13. The reference values to which the integrated signals for individual windows 11, 12, 13 are compared may vary, and in particular may differ in their height. Thus three signals are produced, each signal representing a measure of knocking intensity and being evaluated to determine whether knocking is present. This approach makes it possible to reliably detect in particular individual events that result in an increase in the knocking signal in only one of windows 11, 12, 13 as signal parts that are not based on knocking. It is typical of knocking combustion that knocking is detected in all three windows.

In the description of FIG. 1 it was assumed that windows 11, 12, 13 are defined as time periods. These time periods may be predefined in a fixed manner, i.e., the signal is integrated for individual predefined time periods 11, 12, 13. This has the advantage that it is particularly simple. The time duration of these windows 11, 12, 13 may also be variable, however; in particular, it is also possible to make the duration of these measuring windows dependent on the rotational speed. In that case the duration of each of these windows 11, 12, 13 would be shorter, in particular at higher speeds, since the combustion processes proceed more quickly due to the faster motion of the piston.

In addition, windows 11, 12, 13 may be defined not as time periods but as crankshaft angles. This means that in FIG. 1 axis A would not be a time axis but a crankshaft angle axis. However, in this case it would not be necessary to shorten the windows as a function of an increasing rotational speed, since this is already accounted for by the definition of windows 11, 12, 13 as ranges of the crankshaft.

In FIG. 1, the time duration of all of windows 11, 12, 13 is the same. If it is necessary and practical, the durations of these measuring windows may also differ. In particular window 13, which comes much later in time than the beginning of combustion, when the signal intensities have already dropped significantly, could be lengthened to achieve a greater measuring signal.

Furthermore, it could be determined that a knocking event is always detected in one of windows 11, 12, 13. This is particularly serious if the combustion engine is operated by the engine control unit in a range in which knocking is actually not expected. In such a case, it could then be concluded that a signal is involved here which is not caused by knocking. Using additional measurements, it could then be determined where this signal always occurs, and measuring windows 11, 12, 13 could be placed so that measuring does not occur at the times in which the erroneous signal always occurs. Gaps in which no attempt is made to measure a knocking signal could also be provided in the measuring range, i.e., a range of time is provided for example between windows 11 and 12. As a result of this measure, it is possible to mask out regularly occurring interfering noises such as the opening or closing of a fuel injector for the purpose of determining knocking in the combustion engine.

What is claimed is:

1. A method for detecting knocking, in which a measuring signal of a knock sensor is evaluated during combustion in a cylinder of an internal combustion engine to determine whether or not the combustion is taking place with knocking, the method comprising:

subdividing the measuring signal into a plurality of time windows within a single combustion cycle;

examining each window to determine whether the combustion occurred with knocking, the examining including separately integrating a signal dependent upon the measuring signal in each of the plurality of time windows to produce a plurality of integrated signals associated with the single combustion cycle; and comparing results of the examining of the plurality of windows to each other for a final assessment of whether the combustion occurred with knocking.

2. The method as recited in claim 1, wherein the combustion is assessed as occurring with knocking if a knocking combustion is detected in a majority of the plurality of windows.

3. The method as recited in claim 1, wherein the measuring signal is subdivided into at least three measuring windows, and the combustion is assessed as occurring with knocking if a knocking combustion is detected in at least two of the windows.

4. The method as recited in claim 1, wherein a length of the windows is predefined in a fixed manner.

5. The method as recited in claim 1, wherein a length of the windows is changed as a function of a speed of the internal combustion engine.

6. The method as recited in claim 1, wherein the windows are defined as one of a time range or an angle range.

7. The method as recited in claim 1, wherein gaps are provided between the windows, and no examination of whether the combustion occurred with knocking takes place in the gaps.

8. A device for detecting knocking, in which a measuring signal of a knock sensor is evaluated during combustion in a cylinder of an internal combustion engine to determine whether or not the combustion is taking place with knocking, comprising:

an arrangement configured to subdivide the measuring signal into a plurality of time windows within a single combustion cycle;

an arrangement configured to examine each window to determine whether the combustion occurred with knocking, the examining including separately integrating a signal dependent upon the measuring signal in each of the plurality of time windows to produce a plurality of integrated signals associated with the single combustion cycle; and a comparator to compare results of the examining of the plurality of windows to each other for a final assessment of whether the combustion occurred with knocking.

9. The device as recited in claim 8, wherein the combustion is assessed as occurring with knocking if a knocking combustion is detected in a majority of the plurality of windows.

10. The device as recited in claim 8, wherein the measuring signal is subdivided into at least three measuring windows, and the combustion is assessed as occurring with knocking if a knocking combustion is detected in at least two of the windows.

11. The device as recited in claim 8, wherein a length of the windows is predefined in a fixed manner.

12. The device as recited in claim 8, wherein a length of the windows is changed as a function of a speed of the internal combustion engine.

13. The device as recited in claim 8, wherein the windows are defined as one of a time range or an angle range.

14. The device as recited in claim 8, wherein gaps are provided between the windows, and no examination of whether the combustion occurred with knocking takes place in the gaps.

15. The method of claim 1, further comprising:
producing the measuring signal of the knock sensor, wherein the knock sensor is a structure-borne sound sensor.

16. The device of claim 8, further comprising:
a structure-borne sound sensor for producing the measuring signal.

17. The method of claim 1, wherein the measuring signal measured by the knock sensor is an acoustical signal.

18. The device of claim 8, wherein the measuring signal measured by the knock sensor is an acoustical signal.

* * * * *